W. M. Clarke,
Dressing Leather.
N° 49,606. Fig. 1. Patented Aug. 29, 1865.
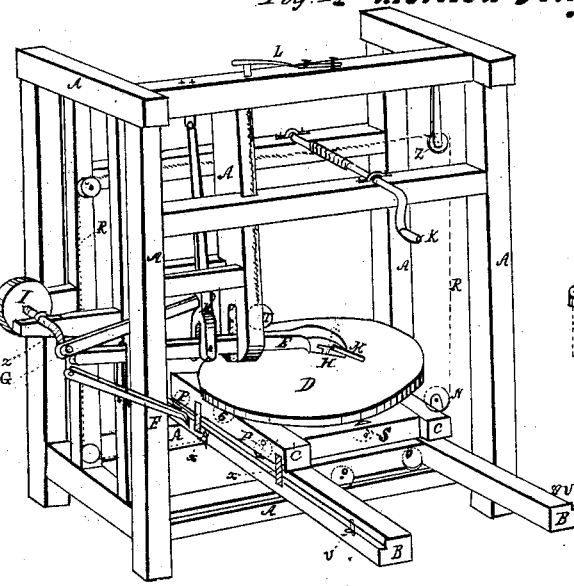
Fig. 7.
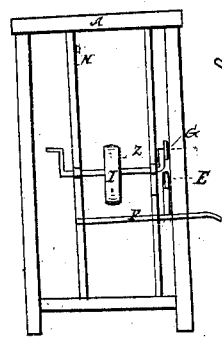
Fig. 2.
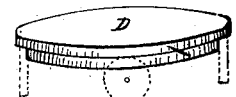
Fig. 3.
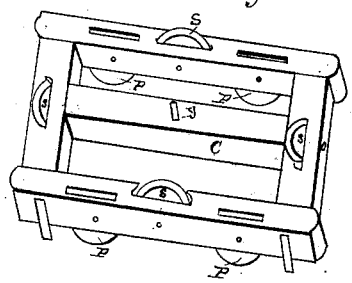
Fig. 4.
Fig. 6.
Fig. 5.
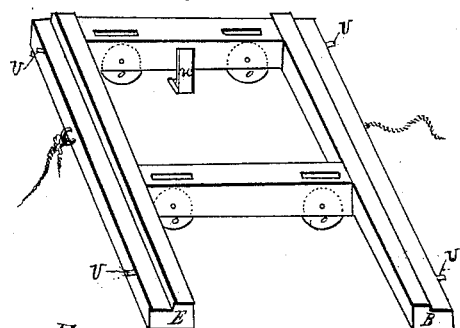
Witnesses.
Fred. B. Hoffman
James E. Fitch
Inventor.
William M. Clarke
by his Attorney
G. B. Towles.
N. PETERS, PHOTO-LITHOGRAPHER, WASHINGTON, D.C.

UNITED STATES PATENT OFFICE.

WILLIAM M. CLARKE, OF BUTTERNUTS, NEW YORK.

IMPROVED MACHINE FOR SCOURING LEATHER.

Specification forming part of Letters Patent No. 49,606, dated August 29, 1865.

*To all whom it may concern:*

Be it known that I, WILLIAM M. CLARKE, of the town of Butternuts, in the county of Otsego and State of New York, have invented a new and useful Machine for Scouring and Setting Out Leather; and I do hereby declare that the following is a full, clear, and exact description of the construction and operation of the same, reference being had to the annexed drawings, making a part of this specification, in which—

Figure 1 is a perspective view of the machine, A A A A being the frame; B B, a carriage; C C, a carriage moving on carriage B B. D is a rotary table rotating on carriage C C, on which the hides or leather are placed to be worked by the rubber or slicker M. E is the rubber-arm, which carries rubber M and hangs on whiffletree H. F is a lever for raising the rubber-arm E out of the way when moving the leather to and from the table D. G is a connecting-rod; I, a pulley for belt, by which to apply mechanical power; K, crank and shaft for moving carriage B B by means of a cord, R R, running over pulleys N N N N. L is a spring to give pressure or weight to rubber-arm E by means of a connecting-rod, the position of which is shown by dotted lines on frame A. O O are friction-rollers on the under side of carriage B B. S S are friction-rollers on the carriage C C to support the table D in its rotary motion; T, a friction-roller running in groove on rubber-arm E, and attached to a rod extending up to spring L. V V are stops to prevent carriage C C from running off carriage B B. X X are guides to hold carriage C in its place. Z is the crank.

Fig. 2 is a perspective view of the rotary table D. The dotted lines represent the friction-rollers upon which it moves.

Fig. 3 is a view of carriage C C. S S S S are friction-rollers, the same as are represented in Fig. 2. P P P P are friction-rollers, upon which carriage C C moves.

Fig. 4 is a view of carriage B B. V V V V are pins or stops to prevent carriage C running off carriage B, as described in Fig. 1. W is a flat hook running in a groove on sill of the frame to prevent the carriage B from getting out of place.

Fig. 5 illustrates the movement of the rubber-arm E. The dotted lines show that the crank Z in revolving forces the connecting-rod G against the end of the rubber-arm E, thus raising the rubber-iron M from table D in its backward motion.

Fig. 6 is a sectional view of the frame A to show the shape of the rails on which carriage B moves.

Fig. 7 is an end view of the machine or frame A A, including Z, crank; F, lever; I, pulley; G, end of connecting-rod; E, end of rubber-arm, heretofore described in Fig. 1.

In the working of my machine I place the leather or hides upon the table D. Then, as I am able to move carriage B B by means of crank K in a longitudinal direction, carriage C C by hand in a transverse direction, and rotate table D at pleasure, I am able to bring every portion of the leather or hides under the working operation of the rubber M, which may be made of iron, glass, or stone. The rubber-arm E, being connected with crank Z, is, by any mechanical power attached to said crank or pulley I, made to carry the rubber M rapidly over the leather and rising from it in its backward motion, while by means of spring L more or less weight may be placed upon the rubber, as desired.

What I claim as my invention, and wish to secure by Letters Patent, is—

1. The frame A, as constructed, in combination with the rotary table D, carriages C and B, substantially in the manner and for the purpose set forth.

2. The carriages B and C, operating substantially in the manner and for the purpose set forth.

3. The ropes R, pulleys N, and crank-shaft K, operating the carriages substantially in the manner and for the purpose set forth.

4. The rotary table D, in combination with the carriages, substantially in the manner and for the purpose set forth.

5. The rubber-arm E, whiffletree H, lever F, connecting-rod G, spring L, and friction-roller T, with connecting-rod attached, the whole combined and operating substantially in the manner and for the purpose herein set forth.

WILLIAM M. CLARKE.

Witnesses:
 E. U. COBB,
 D. N. HURD.